United States Patent
Podraza

[15] 3,669,326
[45] June 13, 1972

[54] SPARE TIRE AND WHEEL CARRIER FOR TRAVEL TRAILERS, MOTOR HOMES, PICKUP TRUCKS, CAMPERS, AND THE LIKE

[72] Inventor: Chester S. Podraza, Chicago, Ill.
[73] Assignee: Blackstone Manufacturing Co., Inc., Chicago, Ill.
[22] Filed: Dec. 4, 1969
[21] Appl. No.: 882,151

[52] U.S. Cl. ............................224/42.21, 214/454
[51] Int. Cl. .............................................B62d 43/02
[58] Field of Search ............224/42.21, 42.24, 42.06, 42.08; 214/454, 450, 451, 452, 453

[56] References Cited

UNITED STATES PATENTS

| | | | |
|---|---|---|---|
| 2,521,815 | 9/1950 | Will | 214/453 X |
| 2,620,105 | 12/1952 | Erickson | 214/454 |
| 3,448,904 | 6/1969 | Sahr | 214/454 X |
| 2,733,847 | 2/1956 | Pyes | 224/42.21 |
| 1,864,829 | 6/1932 | Kennedy et al. | 214/452 |
| 3,428,230 | 2/1969 | Korf | 224/42.06 |
| 2,210,085 | 8/1940 | Langdon | 214/453 |
| 2,801,780 | 8/1957 | Dall | 224/42.21 |

FOREIGN PATENTS OR APPLICATIONS 532,503 10/1954 Belgium...............................214/454

*Primary Examiner*—Philip Arnold
*Attorney*—Max R. Kraus

[57] ABSTRACT

A spare tire and wheel carrier secured to the rear bumper of a vehicle, particularly a travel trailer and/or motor home, pickup truck, camper, and the like, whereby the tire and wheel is normally positioned to be carried on a pivotal arm supported on a mounting member behind the rear door of the vehicle, with the arm maintained at an inclined angle so that the weight is supported on the mounting member, and with the arm adapted to be pivoted through an arc past center to position the tire and wheel outwardly away from the door to permit the door to be opened, and wherein the arm is in a vertical plane substantially parallel with the rear door of the vehicle.

5 Claims, 8 Drawing Figures

3,669,326

Patented Jun 13 1972

Inventor
CHESTER S. PODRAZA
BY Max R. Kraus
ATTY.

Inventor
CHESTER S. PODRAZA
BY
Max R. Kraus
ATTY.

SPARE TIRE AND WHEEL CARRIER FOR TRAVEL TRAILERS, MOTOR HOMES, PICKUP TRUCKS, CAMPERS, AND THE LIKE

BRIEF SUMMARY OF THE INVENTION

There are on the market various types of tire and wheel carriers for use in connection with travel trailers, motor homes, pickup trucks, campers, and the like, that have shortcomings which this invention obviates.

One of the principal objects of this invention is to provide a tire and wheel carrier connected to the rear bumper of a vehicle which normally supports the tire and wheel in a vertical position at the rear of the vehicle but which may be swung out and moved to a position in the same vertical plane in which the tire and wheel is carried but outwardly away from the rear door of the vehicle so that the rear door is readily accessible.

Another object of this invention is to provide a tire and wheel carrier for motor vehicles wherein the tire is supported on a pivotal arm and in which the arm is maintained at an angle so that the weight of the tire will rest on a positive support in an off-center position and where the arm is moved from a tire carrying position over the center and to the opposite off-center position to support the tire and wheel in a vertical plane away from the rear door so as not to interfere with the opening of said door.

Another object of this invention is to provide a tire and wheel carrier having a pivotal arm which moves through an arc in the same vertical plane to move the tire from its supporting position at the rear of the vehicle to a position away from the door.

Other objects will become apparent as this description progresses.

Figure 2:
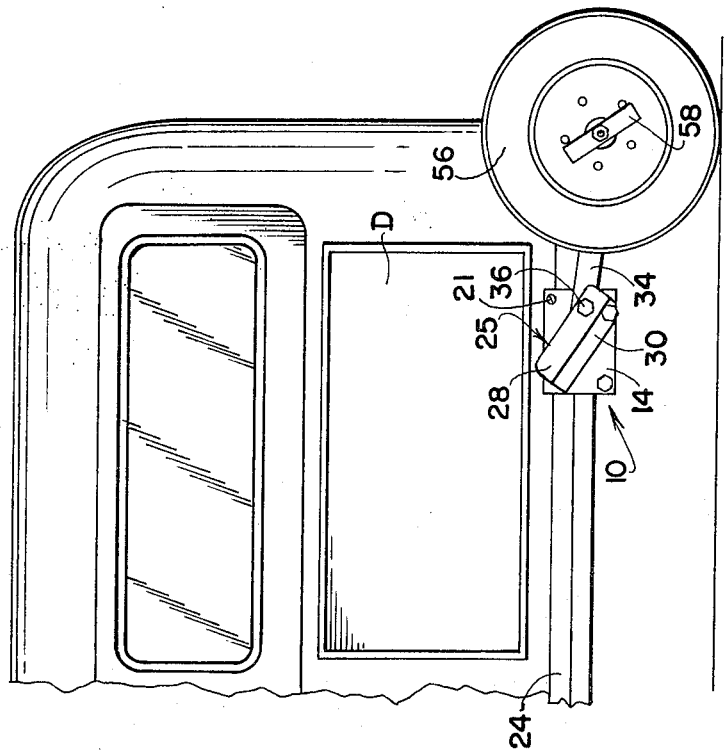
FIG. 2 is a view similar to FIG. 1, but with the carrier swung to a position clear of the rear door of the vehicle.

The tire and wheel carrier, generally designated by the numeral 10, comprises a mounting unit formed of a vertically positioned mounting plate 14 having a rearwardly extending plate 16 at right angles to the mounting plate 14. Slidably supported on the mounting or base plate 14 is a U-shaped bolt 18, with the sides of the U-shaped bolt extending through suitable openings in the mounting plate 14 so as to be slidable relative to the plate. The side ends of the U-shaped bolt are threaded and are engaged by suitable nuts and washers to hold the bolt 18 with respect to the mounting plate 14 but to permit sliding movement relative thereto. The U-shaped bolt 18 is mounted on said mounting plate 14 adjacent one end thereof.

Adjacent the opposite end of the mounting plate 14 is a pair of spaced openings which slidably receive a pair of externally threaded bolts 20 on which is mounted a flat rectangular-shaped bar 22 having openings to receive the outer ends of the bolts 20. The said outer ends of the bolts have nuts 23 thereon. The upper bolt has a flat head 21 which is countersunk in the plate 14 to permit the arm 34 to pass when pivoted to its lowered position. The mounting plate 14, the U-shaped bolt 18, and the bolts 20 form the mounting unit which is secured to the conventional rear bumper 24 of a conventional travel trailer.

To effect securement, the threaded nuts 23 are removed from the bolts 20 and the bar 22 is removed from the end of the bolts. The mounting plate 14 is positioned exteriorly of but adjacent the bumper 24 and the threaded bolts are positioned to extend above and below the bumper and transversely of the bumper and the bar 22 is placed on the bolts 20 and is secured by the nuts 23. To secure the other side of the mounting plate 14 to the bumper, the U-shaped bolt 18 is removed from the mounting plate by unthreading the nuts thereon and then placing the U-shaped bolt back around the bumper 24 and reattaching the bolt to the mounting plate by means of nuts. The mounting means is thus firmly secured to the rear bumper 24 of the vehicle.

Permanently affixed to the mounting plate 14, as by welding or brazing is a retainer bracket 25 having a central wall 26 and oppositely directed side walls 28 and 30. The inner side wall 30 is welded to the mounting plate 14 with the outer side wall 28 facing outwardly of the plate and extending upwardly to define a channel 32 between the outer side wall 28 and the mounting plate 14. The retainer bracket 25 is mounted on the mounting plate at an angle of approximately 50°. The arm 34 of the tire carrier is supported in the channel 32 and is pivotally connected as at 36 at its inner end to said mounting plate 14 and outer side wall 28 of the retainer bracket by means of a bolt 36 extending through suitable openings in said arm, as well as openings in the plate and bracket. A nut is mounted on the end of the bolt 36.

The arm 34 is formed of a tubular stock, generally square in cross-section. Formed in the upper and lower walls of said tubular arm 34 is a pair of elongated alined slots 40. A latch lever 42 extends through said slots and is pivotally supported on a rivet pin 44 secured to said arm. The latching lever 42 has a recess 46 engaged by one end of a spring 48 which is positioned in the tubular arm, with the opposite end of the spring secured as at 35 to the inner end of the upper wall of the arm 34. The latching lever has a latching slot 50 which is adapted to engage the outer edge of the central wall 26 of the retainer bracket 25. The latching lever 42 is normally biased to pivot to a latching position, as shown in FIG. 5, by means of the spring 48, and when the latching slot 50 of the latching lever 42 is in engagement with the central wall 26 of the retainer bracket 25 the arm 34 will be latched to the retainer bracket.

Figure 5:
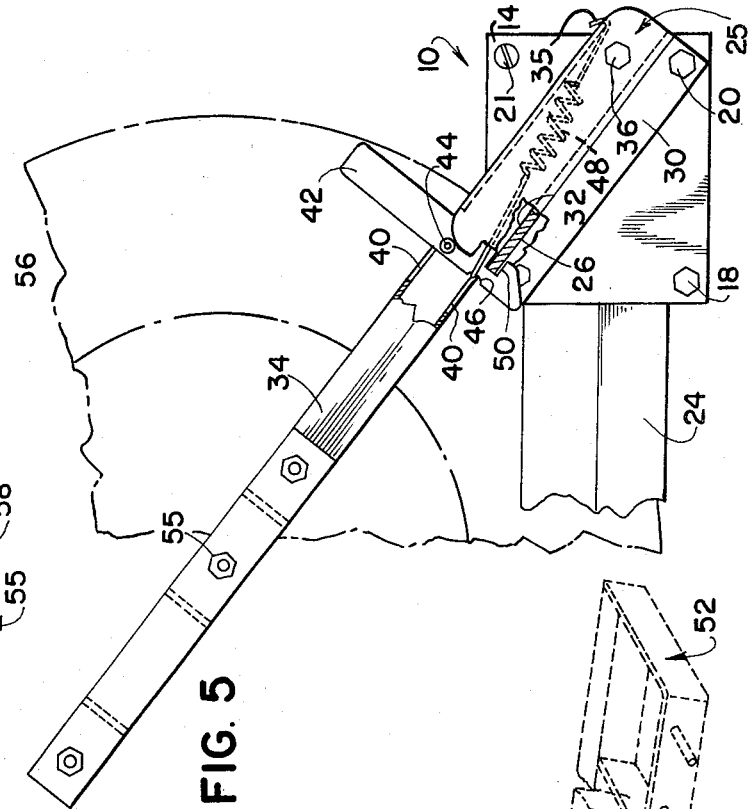
FIG. 5 is an enlarged side rear view showing the carrier in tire supporting position as in FIGS. 1 and 3.
Figure 6:
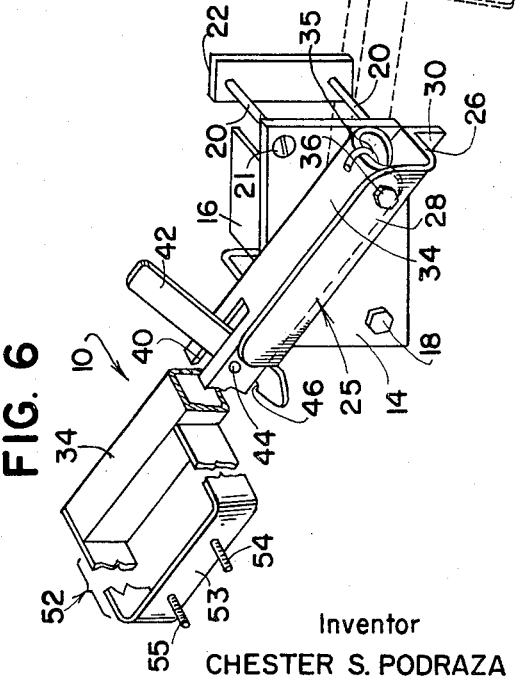
FIG. 6 is a perspective view, broken away, of the carrier as viewed from the rear.

As can best be seen in FIG. 5, the arm 34 when supporting the tire normally rests on the retainer bracket 25. The weight of the tire on the pivotal arm 34 will normally urge the arm in a counterclockwise direction. Thus, the weight of the arm 34 and the tire when it is thus supported will be on the retainer bracket 25 and the mounting plate 14 and will not be on the latching lever 42. The latching lever will only lock the parts together and will not carry any appreciable weight. The arm 34 in this position is inclined approximately 50° from the horizontal plane.

Welded or brazed to the outer end of the pivotal arm 34 is a U-shaped bracket 52 on which the tire and wheel is mounted. The bracket 52 extends laterally of the side of the arm 34. The front wall 53 of the U-shaped bracket supports a pair of threaded bolts or studs 54 and 55 which are fixed as by welding or brazing to said front wall 53, with the threaded ends of the bolts or studs extending outwardly. The tire and wheel 56 is positioned on the U-shaped bracket 52 so that an opening 57 on the wheel fits on the stud 55, with a nut engaging the stud to lock the wheel to the bracket 52. A metal locking strip 58 is secured to the other stud 54 and said locking strip engages the wheel and is secured to the stud 54 by a nut to further lock the wheel to the bracket 52. This arrangement is used to secure conventional wheels having five or six lugs.

Figure 7:
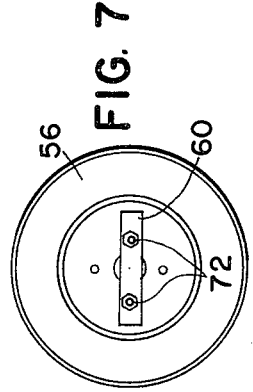
FIG. 7 is a rear end view of a four lug wheel, held on the carrier with a modified adaptor best shown in FIG. 8.
Figure 8:
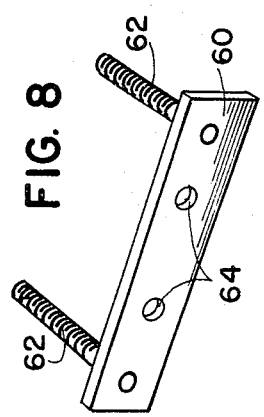
FIG. 8 is a perspective view of the modified adaptor.
Figure 3:
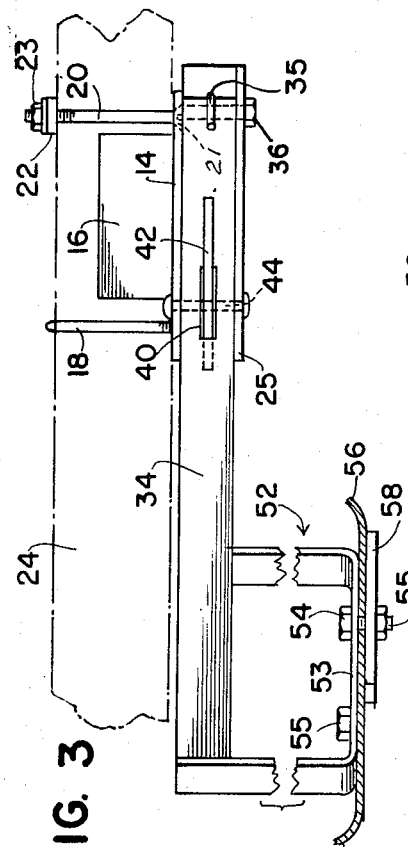
FIG. 3 is a top plan view of the carrier in the position it occupies in FIG. 1.
Figure 4:
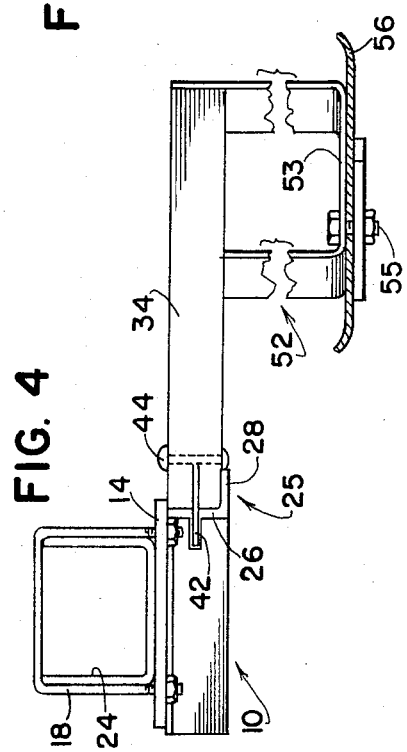
FIG. 4 is an end view of the tire carrier as positioned in FIG. 3.

To hold the newer type of wheels having four lugs, as shown in FIG. 7, an adapter 60 (FIG. 8) is used. The adapter 60 is an elongated strip of steel which has threaded bolts or studs 62 fixed thereto as by welding or the like adjacent the opposite ends of the adapter. The adapter has a pair of spaced openings 64 therein. The adapter 60 is secured to the wheel by the studs 62 passing through the wheel openings and the adapter is locked to the wheel by suitable nuts on the studs 62. The adapter is then secured to the U-shaped bracket 52 by positioning the openings 64 of the adapter on the studs 54 and 55 of the adapter and then applying the nuts on the studs. The tire and wheel may be removed from the U-shaped bracket by disengaging the respective nuts.

Figure 1:
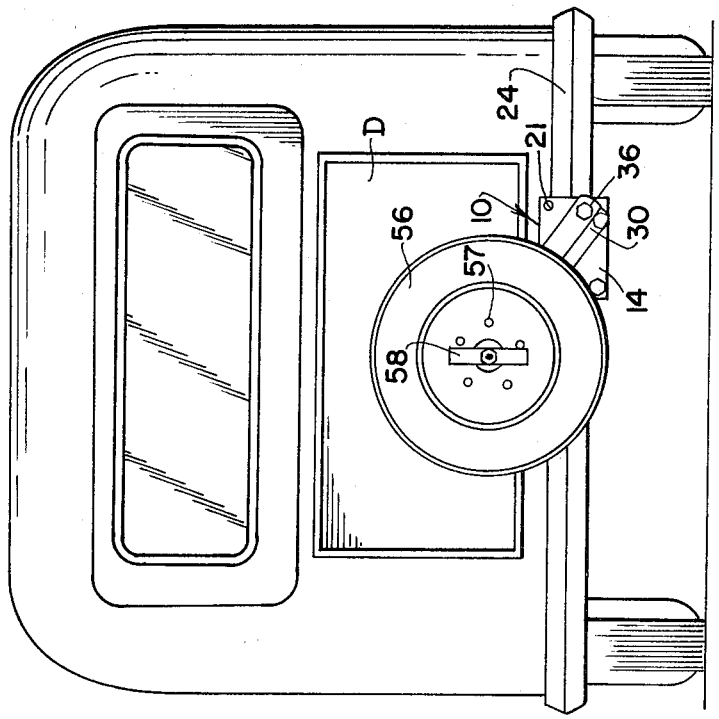
FIG. 1 is a rear end view showing the rear of a trailer or mobile home with the spare tire and wheel carrier of this invention attached thereto and in position for carrying the tire.

The carrier is mounted on the rear bumper 24 of the vehicle and the mounting plate 14 is positioned to one side of the center of the vehicle so that the pivotal arm 34 will support the wheel and tire approximately centrally of the rear of the vehicle, as best seen in FIG. 1, and in a position substantially behind the rear door D of the vehicle. With the arm positioned as shown in FIG. 1, the latching lever 42 (FIG. 5) will engage the retainer bracket 25 on the mounting plate 14 to lock the pivotal arm 34 against pivotal movement. In this position the spare wheel and tire is carried by the vehicle. When it is desired to gain access to the rear door D of the vehicle, the latching lever 42 is manually engaged and by pressing downwardly against the outer end of said lever the front end of the lever is pivoted upwardly to become disengaged from the retainer bracket 25. The arm 34 with the tire and wheel mounted thereon can then be pivoted about the pivot 36 through an arc which passes center to an off-center position on the opposite side, whereby the tire and wheel will be positioned while on the arm 34 to rest on the ground surface laterally behind one side of the vehicle, as shown in FIG. 2.

The arm 34 is at all times maintained in a vertical plane parallel with the rear of the vehicle. This is so when the tire and wheel are carried behind the vehicle, as in FIG. 1, and also when the arm is rotated or pivoted from its carrying position to its non-carrying position, that is, laterally outward adjacent one side of the vehicle, as in FIG. 2. When the arm is pivoted to the FIG. 2 position, the wheel and tire are positioned away from the rear door D of the vehicle so that the rear door is readily accessible without interference from the carrier. The rear door may then be swung open. After the door D is closed the carrier may be swung back to its initial position (FIG. 1) as previously described.

At all times the carrier remains connected to the bumper and the swinging of the arm 34 from one side to the other is relatively easy since the weight is borne by the mounting bracket. No detachment is necessary in order to swing the arm from one position to another and vice versa, and the carrier is ready at all times for this function.

It will be understood that various changes and modifications may be made from the foregoing without departing from the spirit and scope of the appended claims.

What is claimed is:

1. Means for carrying a spare tire adjacent the rear of a vehicle, said means comprising a mounting member attachable to the rear bumper of the vehicle, a retainer on said mounting member, said retainer having means for supporting an arm inclined at an angle of approximately 50° to the horizontal, an arm pivotally secured to said mounting member, said arm having means adapted to support a tire adjacent the outer end of the arm, said arm supporting said tire in its supporting and non-supporting position, said arm adapted to rest on said retainer means to normally maintain said arm at an inclined angle of approximately 50° with respect to a horizontal plane forwardly of the arm pivot in its supporting position to carry the tire on the vehicle so that the weight will normally urge the arm to remain positioned at said inclined angle of approximately 50° forwardly of the arm pivot to carry the tire in a vertical plane on the vehicle, with the weight principally supported on the mounting member forwardly of the arm pivot, said arm adapted to be swung outwardly through an arc in the opposite direction outwardly and rearwardly of the arm pivot to a non-supporting position to position the tire adjacent to one side of the vehicle in the same vertical plane, said arm having spring biased latching means positioned between said arm pivot and the outer end of the arm for latching said arm to said mounting member to latch said arm at the approximately 50° angle position.

2. Means for carrying a spare tire adjacent the rear of a vehicle, said means comprising a mounting member attachable to the vehicle, an arm comprising a tubular member pivotally secured to said mounting member, said arm adapted to support a tire adjacent the outer end of the arm, said arm being normally maintained at an inclined angle so that the weight will normally urge the arm to remain positioned at said inclined angle to carry the tire on the vehicle, a latching member latching said arm to said mounting member to prevent accidental movement of said arm, said latching member extending through an opening in said tubular member, and a spring supported in said tubular member to normally bias said latching member to latching position, said arm adapted to be swung outwardly in the opposite direction to position the tire adjacent to one side of the vehicle.

3. A structure as set forth in claim 2, in which the mounting member has means for attachment to the rear bumper of a motor vehicle.

4. A structure as set forth in claim 2, in which the mounting member has a retainer bracket on which the arm rests when in inclined position.

5. A structure as set forth in claim 2 in which the lower end of said latching member has latching means for engaging the mounting member and in which the upper end of said latching member extends outwardly beyond the opposite side of said tubular member to be manually engaged for pivoting said latching member to an unlatching position.

* * * * *